Figure 1:
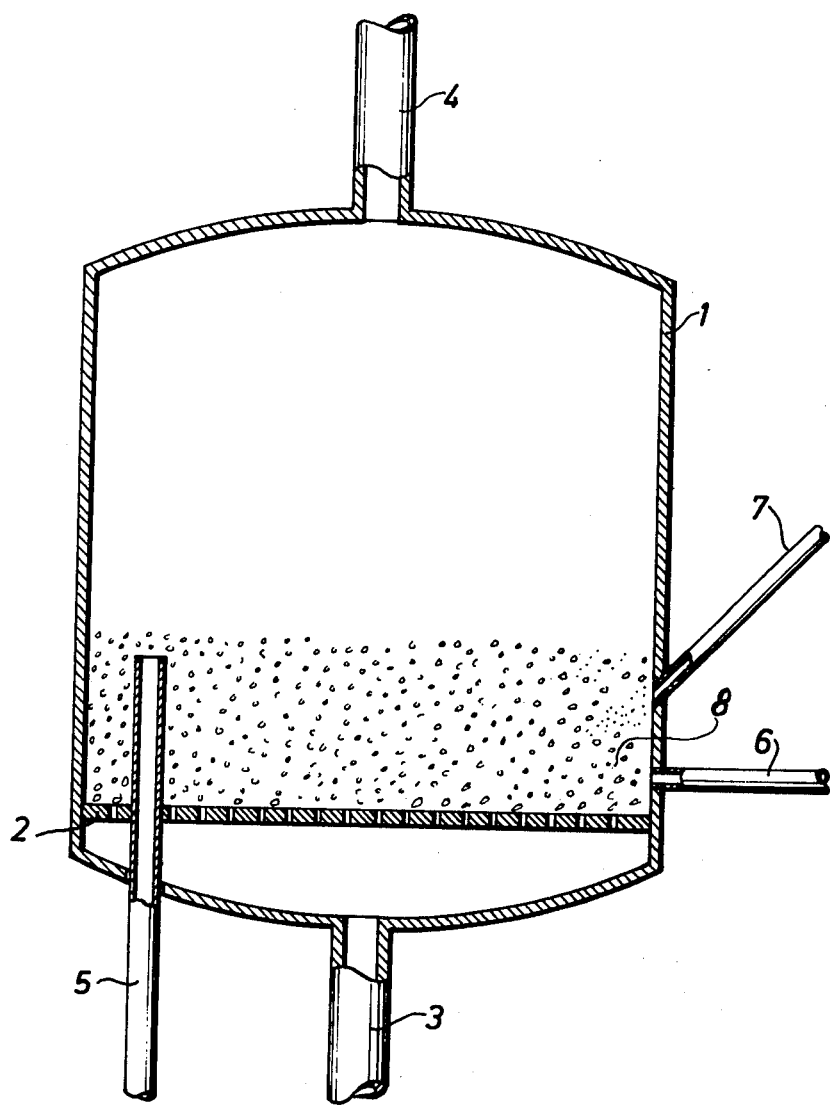

United States Patent [19]

Collin et al.

[11] 4,084,958

[45] Apr. 18, 1978

[54] METHOD OF REDUCING FINELY GRAINED MATERIAL CONTAINING IRON OXIDES IN A FLUID BED

[75] Inventors: Per Harald Collin, Falun; Björn Widell, Vesteras, both of Sweden

[73] Assignee: Stora Kopparbergs Bergslags Aktiebolag, Falun, Sweden

[21] Appl. No.: 810,977

[22] Filed: Jun. 29, 1977

Related U.S. Application Data

[63] Continuation of Ser. No. 578,422, May 19, 1975, abandoned.

[30] Foreign Application Priority Data

May 20, 1974 Sweden .............................. 7406695

[51] Int. Cl.² .............................................. C21B 13/02
[52] U.S. Cl. .............................................. 75/36; 75/4; 75/26
[58] Field of Search .................................. 75/4, 26, 36

[56] References Cited

U.S. PATENT DOCUMENTS

| | | | |
|---|---|---|---|
| 2,742,353 | 4/1956 | Ogorzaly | 75/26 |
| 2,918,364 | 12/1959 | Lesher | 75/4 |
| 3,607,217 | 9/1971 | Metrailer | 75/26 |

Primary Examiner—M. J. Andrews
Attorney, Agent, or Firm—Curtis, Morris & Safford

[57] ABSTRACT

Fine-grained iron oxide reduction in a fluidized bed; a reducing agent in the form of fine-grained solid carbonaceous material containing volatile constituents is introduced into at least one zone of the fluidized bed; in said zone the volatile constituents are driven off, and a tarry material is temporarily formed on the surface of the particles of the carbonaceous material; the fine-grained iron oxide to be reduced is introduced into said zone; iron oxide particles adhere to the tarry carbonaceous particles; in this manner micro-aggregates which are especially desired are formed; but the formation of bigger aggregates is prevented.

4 Claims, 2 Drawing Figures

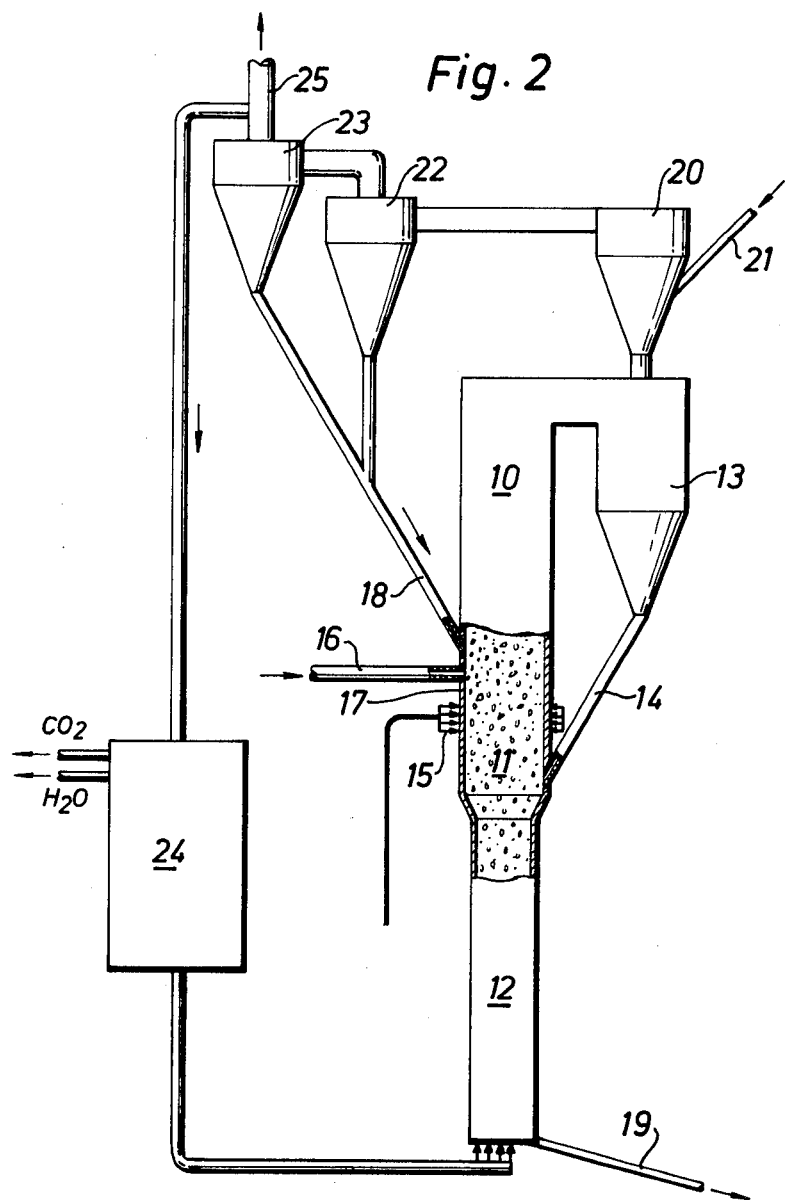

METHOD OF REDUCING FINELY GRAINED MATERIAL CONTAINING IRON OXIDES IN A FLUID BED

This is a continuation of application Ser. No. 578,422, filed May 19, 1975, now abandoned.

The present invention relates to a method of preventing sticking when reducing fine grained material containing iron oxides in a fluid bed.

It is a well known fact that one of the reasons that the fluid bed technique has been used to a very limited extent for producing entirely or partially metallized iron ore concentrates, is the difficulty of avoiding sticking at the high reduction temperatures which are required for reasons of reaction kinetics. Sticking is when the small particles of material in the bed agglomerate into larger particles and aggregates which in the end make fluidization impossible.

It has already been proposed to spray oil into a hot fluid bed in order to effect cracking of the oil to form cokelike products which are deposited on the iron ore particles and prevents sticking. It has also been proposed that when reducing in several stages, a suitably low temperature should be maintained in part of the system for a deposit of carbon to be formed by the reducing gas containing carbon monoxide, this carbon being deposited as soot on the particles. Similar proposals have been made to use solid fine grained carbonaceous material, in such quantities that the carbonaceous particles mechanically prevent sticking between the more or less reduced ore particles. There are drawbacks to all these methods.

The present invention relates to a method of avoiding sticking when reducing material containing iron oxides in fluid beds supplied with fine grained iron ore concentrates and fine grained solid carbonaceous material by effecting the formation in the hot fluid bed of micro-aggregates between particles of concentrate and the porous, popcorn-like coke particles formed when the carbonaceous material is introduced into the bed. Micro-aggregates means small aggregates, generally comprising one coke particle and one or a few concentrate particles adhered thereto. Since the majority of the concentrate particles are in this way aggregated to coke particles, sticking can be completely avoided when reducing in fluid beds at high temperature with reducing gases, even if the flow of carbonaceous material is small in relation to the flow of iron ore concentrates.

According to the invention a preferably continuous flow of solid fine grained carbonaceous material having a high content of volatiles is introduced into a fluid bed at one or several points. At the same time fine grained material containing iron oxides is introduced in a proportionally adjusted flow within the limited zones around said inlets, where the volatiles in the carbonaceous material are driven off and partially gasified and coked. When fine grained carbonaceous material is introduced into a hot fluid bed consisting, for example, of micro-aggregates of coke and concentrate, the particles are heated extremely quickly causing tar-like substances to "sweat out" and accumulate on the surface of the particles. The more rapid the heating, the more tar will have time to accumulate on the surface before it is cracked to gas and coke. Such tar covered particles seem to have a preference for adhering to particles of concentrate, thus forming micro-aggregates of coke and concentrate. Surprisingly enough the aggregates do not grow over the micro stage. The reason for this is probably that the period during which the tar layer is sticky before it is gasified and coked is so short that the particle does not have time to come into contact with more than a few particles of concentrate.

In order to achieve a high rate of micro-aggregate formation, meaning that a considerable proportion of the concentrate particles are aggregated with coke particles, the carbonaceous material should have $>15\%$ volatiles. Better results are obtained with higher contents of volatiles such as in bituminous coal and lignite. The particle size of the carbonaceous material is dependent on which type of fluid bed is desired. For conventional fluid beds the particle size should be $<5$ mm and for fluid beds of the circulating type $<0.5$ mm. For technical reasons of fluidization the material containing iron oxide should have a smaller particle size than the carbonaceous material because of its higher specific weight.

The dimensions of the zone within which the formation of micro-aggregates occurs is dependent on the particle size of the carbonaceous material and its content of volatiles, as well as temperature and gas velocity in the bed. A method which can be used in certain cases to ascertain that the material containing iron oxides arrives in the intended zone is to introduce it mixed together with the carbonaceous material. However, if the material containing iron oxides is preheated this method cannot be used due to the risk of clogging the inlet nozzles.

A reducing gas suitable for reduction of material containing iron oxides preferably consists of a mixture of CO and $H_2$ obtained by partial combustion of carbonaceous fuel with oxygen or gases containing oxygen, such as air. The gas may either be supplied to the fluid bed from an external gas producer or be produced internally in the bed by partial combustion of a part of the carbonaceous material, which then must be supplied in greater quantities.

The formation of micro-aggregates gives efficient protection against sticking even at high degrees of metallization. Thus at 70–80% metallization, for example, and 900° C the flow of carbonaceous material required is not greater than that required to give a product containing carbon corresponding to its oxygen content plus the desired excess. Such a product can give crude iron with $\sim 4\%$ carbon upon melt reduction without extra addition of coke for the reduction process.

The method according to the invention will be further described in connection with its use in two different types of fluid bed reactors.

In FIG. 1 its use is illustrated with a conventional fluid bed and in,

FIG. 2 its use with a circulating fluid bed.

FIG. 1 shows a conventional fluid bed consisting of a reactor chamber 1 with a gas-distributing bottom 2, supply pipe 3 for gas and outlet 4 for consumed gas. The gas supplied fluidizes the bed above the distributing bottom. A suitable flow of particles is tapped off through an outlet pipe 5. When the fluid bed is used for reduction of material containg iron oxides, a preferably continuous flow thereof is supplied through an inlet pipe 7 into the bed where it is reduced by a reducing gas supplied through the pipe 3, and the reduced bed material is tapped through the outlet pipe 5. According to the invention coal powder or other carbonaceous materials with a high content of volatiles are supplied continuously in an adjusted flow through a supply pipe 6. At the outlet of the supply pipe 6 a zone 8 is formed where the volatiles are driven off and partially gasified and coked. The supply pipe 7 for the material containing iron oxides is located so that the material is fed into said zone, whereupon micro-aggregates of coke and concentrate are formed.

FIG. 2 shows a circulating fluid bed, i.e. a fluid bed in which the velocity of the gas is kept so high that the bed fills the entire reactor chamber and the gas leaving therefrom has a high content of solid particles which are separated in a cyclone and then returned to the reactor chamber. For the materials in question here, this type of fluidization is obtained at a gas velocity of 2.5 – 5 m/sec. The particle size of material treated in a circulating fluid bed can be smaller than that used in a conventional fluid bed. For instance, the material containing iron oxides should have an average particle size <0.5 mm, preferably <0.3 mm. The fluidized bed reactor shown in the drawing, which is intended for reduction of material containing iron oxides, conssists of a reactor chamber 10, 11, 12, the upper part 10 being connected to a cyclone 13 having a return pipe 14 which returns the separated solid particles to the central part 11 of the reactor chamber. In the lower part 12 the material containing iron oxides is reduced by a reducing gas introduced from below. When this gas reaches the central part 11 of the reactor, the gas is partially combusted together with the solid carbonaceous material by air supplied through a number of small nozzles 15, thus generating sufficient heat for reaction. A continuous flow of fine grained carbonaceous material having a high content of volatiles is supplied to the central part 11 through a supply pipe 16. The volatiles are very quickly driven out of the particles of carbonaceous material in zone 17 around the inlets. Pre-heated material containing iron oxides is introduced in a proportional flow in these zones through supply pipe(s) 18. In this way micro-aggregates of coke and concentrate are formed which are carried by the gas through the upper part of the reactor chamber to the cyclone 13 and returned to the central part 11 of the reactor through the return pipe 14. After one or several circuits in the upper part of the reactor, the particles, which are now heated and more or less reduced, pass down into the lower part 12 of the reactor where they are further reduced by the strongly reducing gas there, after which they are drawn off through the outlet 19. The flow of solid material fed to the reactor and the flow of material drawn off therefrom are controlled so that the quantity of solid material in the reactor remains constant. The transmission of heat from the upper part of the reactor to its lower part is high due to the considerable internal circulation of bed material, which gives extremely good temperature equalization. Partially combusted gas leaves the cyclone 13 to a venturi means 20, to which untreated material containing iron oxides is supplied at 21. This material is pre-heated by the gases, separated in two cyclones 22 and 23 and supplied through the supply pipe 18 to the central part 11 of the reactor. Some of the gas leaving the cyclone 23 is freed from $CO_2$ and $H_2O$ in washing means 24 and used, after heat-exchanging and pre-heating, as the reducing gas in the lower part 12 of the reactor, while the remainder 25 is is used for some other purpose, such as for providing electric energy for melting and final reduction of the completely or partially reduced product obtained.

What is claimed is:

1. A method of preventing sticking or agglomeration between solid particles of iron oxide, partially reduced iron oxide, and carbonaceous material during reduction in a fluidized bed of these particles in a fine-grained form comprising the steps of: introducing at one or more supply points in a fluidized bed zone a fine-grained carbonaceous material containing at least 15% volatiles; introducing oxygen in said fluidized bed; maintaining a combustion in said bed by reacting part of said carbonaceous material with oxygen; the temperature in the bed being substantially higher than the temperature required for driving off said volatiles in said carbonaceous material, whereby the high temperature causes volatiles to be rapidly driven off within limited zones around said supply points; directing the stream of said fine-grained particles containing iron oxides to substantially coincide with said limited zones thereby causing to a substantial extent said fine-graned particles of the iron oxide containing material to adhere to particles of carbonaceous material.

2. The process as defined in claim 1 and wherein the temperature is controlled by the amount of oxygen being introduced.

3. The process as defined in claim 1 and wherein the fine-grained particles of iron oxide and carbonaceous material are of a size less than 0.5 mm and during reduction a degree of metallization achieved is about 70 to 80%.

4. The method as defined in claim 1 wherein the reduction is carried out in a circulating fluidized bed zone wherein fluidizing gas is added to said fluidized bed zone at a high velocity, fluidizing gas is withdrawn having a high content of solid particles from said fluidized bed zone, fluidizing gas is separated from said solid particles, said gas is returned to the bottom of the fluidized bed zone, and a portion of said solid particles are returned to the fluidized bed zone, said solid particles having an average size of less than 0.5 mm.

* * * * *